Jan. 13, 1959  G. W. GURLEY  2,868,505
SELF DRESSING FAIRLEAD
Filed Oct. 9, 1956
FIG_1
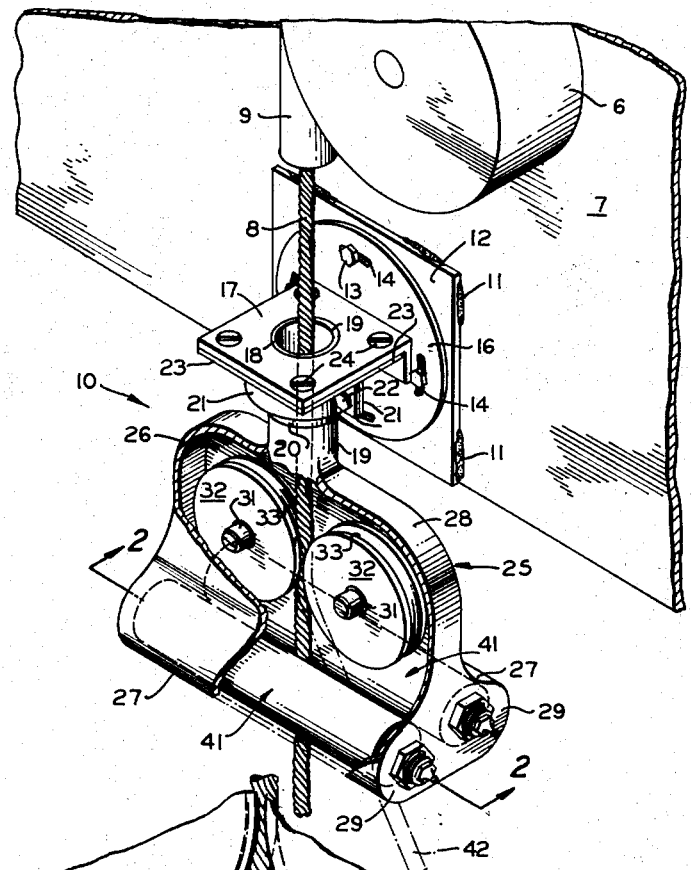
FIG_2
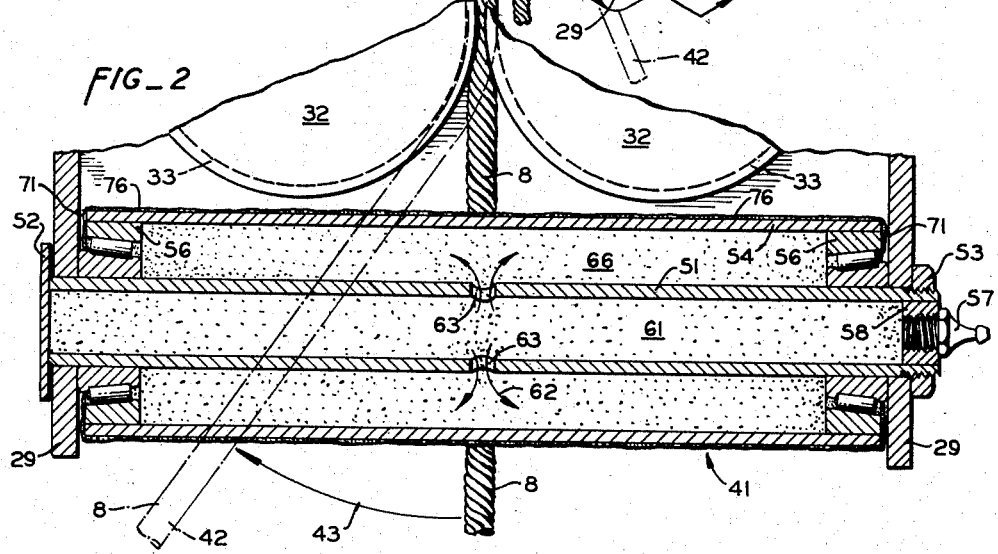
INVENTOR.
GLENN W. GURLEY
BY
Lothrop & West
ATTORNEYS

2,868,505
SELF DRESSING FAIRLEAD

Glenn W. Gurley, Sacramento, Calif.

Application October 9, 1956, Serial No. 614,881

2 Claims. (Cl. 254—190)

The invention relates to an improvement in wire cable fairleads of the kind used with excavating and other earth moving equipment and, more particularly, to a fairlead improvement which serves to prolong the cable life by constantly dressing the cable and guide rollers with a coating of lubricant.

Rotating fairleads have long been known and used in connection with wire cables and have operated in a reasonably satisfactory manner. However, the life expectancy of both the fairleads heretofore used and the wire cables used in conjunction therewith have been short. The constant abrasion and vibrational shocks to which the cable and fairlead are mutually subjected in operation has led to quick wear, especially on the cable, necessitating frequent cable changes and consequent expensive and non-productive down-time for repair and replacement.

It is therefore an object of the invention to provide a rotating fairlead which greatly extends the life expectancy of a wire cable used in conjunction therewith.

It is another object of the invention to provide a rotating fairlead which requires very little attention except periodic lubrication through a convenient grease fitting.

It is yet another object of the invention to provide a rotating fairlead which largely prevents the entry of dust and other deleterious matter ordinarily causing rapid wear.

It is still another object of the invention to provide a rotating fairlead which continuously coats or dresses the wire cable with lubricant and thereby prolongs the life of both the cable and the rotating parts of the fairlead.

It is a further object of the invention to provide a rotaing fairlead which is relatively inexpensive to manufacture.

It is still a further object of the invention to provide a rotating fairlead which is durable and which has but few moving parts to get out of order.

It is yet a further object of the invention to provide a rotating fairlead which is wholly compatible with substantially all present day equipment requiring the use of rotating fairleads.

It is yet another object of the invention to provide a rotating fairlead which greatly reduces maintenance and the repair costs as well as loss of time and other expenses resulting from cable replacements.

It is yet another object of the invention to provide a generally improved fairlead.

Other objects, together with the foregoing, are attained in the embodiment described in the following description and shown in the accompanying drawings in which:

Figure 1 is a perspective of a rotating fairlead of the invention in a typical environmental situation, a portion of the fairlead being broken away to disclose the interior construction.

Figure 2 is a section, the plane of section being indicated by the line 2—2 of Figure 1, a portion of the figure being broken away to reduce the extent thereof.

While the self dressing rotating fairlead of my invention is susceptible of numerous physical embodiments, depending upon the particular environment and use to which it is to be put, a substantial number of the herein shown and described fairleads have been made and used under the most adverse conditions of weather and wear and have for long periods performed in an eminently satisfactory manner.

A cylindrical housing 6 mounted on a structural member 7, such as a boom, of a piece of excavating equipment (not shown) encloses a spring-urged drum (not shown) of conventional make. About the drum is reaved a cable 8 leading from the drum through a cable pipe 9 and the fairlead 10 to a member such as a bucket (not shown).

Appropriately secured to the boom member 7 as by weldments 11 is a plate 12. A plurality of removable fastenings 13 passing through a plurality of arcuate slots 14 in a circular plate 16 and into the plate 12 permits affixing of the plate 16 to the boom in proper angular attitude. Mounted on the circular plate 16 and disposed normally thereto is a square mounting bracket 17 provided with a central circular aperture 18. Rotatably mounted on the bracket 17 and disposed within the aperture 18 is a pilot tube 19, or collar, encompassed by an appropriate anti-friction bearing 20 of conventional make. The inner race of the bearing is secured as by set screws, to the tube 19 while the outer race is clamped by and keyed to a split clamp 21, the clamp being tightened by fastenings 22. The clamp pair 21 depend from and are welded to a horizontal clamp plate 23 mounted on the bracket 17 by fastenings 24. As a consequence of this construction, the pilot tube 19 is freely rotatable with respect to the mounting structure.

By suitable orientation of the circular plate 16 the axis of the cable 8 can be made to coincide substantially with the axis of the cable pipe 9 and the pilot tube 19 so that the cable pays off or is wound on the enclosed drum in proper fashion and without scraping the walls of the pipe 9 and tube 19.

Depending from and secured to the lower end of the pilot tube 19 is a housing, generally designated by the numeral 25. The housing 25 comprises a pair of substantially parallel spaced rectangular side plates 26 flaring arcuately outwardly adjacent their lower ends to form a pair of opposed elongated bell mouth portions 27, or skirts. Extending between the margins of the pair of side plates 26 is a cover plate 28 flaring in conformity with the bell mouth portions 27 adjacent the ends of the housing to form a pair of ears 29 at each end of the housing. The cover plate in conjunction with the skirts 27 and the side plates serve to keep out dust, grit and other deleterious matter which is so frequently encountered during the excavating operations with which the equipment and rotating fairlead are customarily used. As a consequence of this covering, the effective life of the fairlead and the cable is substantially lengthened.

Rotatably mounted between the opposing walls of the side plates 26 is a pair of shafts 31, or pins, to which is secured a corresponding pair of sheaves 32. Preferably, the sheaves rotate on suitable anti-friction bearings, such as needle bearings mounted on the pins. The shafts 31 are so spaced with respect to the sheave diameters, and to the conformation of the sheave grooves 33, that the cable 8 is substantially encompassed by the grooves adjacent the nearest point of approach of the two sheaves; and, thereby, the sheaves assist in maintaining the vertical alignment of the cable 8 within rather close tolerances. Consequently, the cable is maintained substantially in a central location within the pilot tube 19, thus giving a straight and unrestricted run through the pipe 9 and to proper reaving about the drum within the housing 6.

So long as the cable run from the sheaves 32 to an exterior member, such as a clam shell bucket, is substantially within the plane of the two sheaves no lateral or transverse thrust on the sides of the grooves 33 is encountered, and no tendency to bind arises. Where, however, a lateral transverse component is given to the cable, binding will take place on the sheaves unless appropriate means are provided to avoid this consequence. Accordingly, a pair of rollers 41 is mounted adjacent the lower or open end of the housing 25, the rollers being so spaced that at the line of closest approach the distance between the rollers only slightly exceeds the diameter of the cable 8. The axes of the two rollers are located normal to the axes of rotation of the two sheaves and thus the cable portion between the sheaves and an exterior excavating member, such as a bucket, is confined solely to translational movement in a longitudinal direction between the two rollers, and as appears most clearly in outline in Figures 1 and 2 and indicated by the numeral 42, and by the arrow 43 in Figure 2.

Each of the rollers 41 is mounted between the corresponding ear portions 29 at the ends of the housing. Each roller 41, as appears most clearly in Figure 2, comprises an inner tube 51 closed at one end by an appropriate plate 52 and secured at the other end by a suitable fastening such as a nut 53 in engagement with a threaded portion on the end of the tube 51. The threaded fastening 53 is taken up tightly enough so that the inner tube 51 is securely clamped between the ears 29 and is preferably immobile. Concentrically disposed with respect to the inner tube 51 is an outer tube 54 suitably spaced from and rotatably disposed with respect to the inner tube 51 by an appropriate pair of anti-friction bearings 56.

Suitably mounted on at least one end of the inner tube 51 is an appropriate grease fitting 57 of conventional make, threadably engaged with a plug 58 disposed in secure position at the end of the inner tube. An appropriate lubricant, such as grease, is introduced through the fitting 57. On the initial charge, sufficient lubricant is admitted completely to fill the chamber 61 within the inner tube 51. When the chamber 61 is filled with lubricant and additional lubricant is introduced, pressure being applied to the lubricant, a corresponding amount of lubricant passes radially outwardly in the direction indicated by the arrows 62 through an appropriate pair of apertures 63 in the wall of the tube 51. Additional lubricant is introduced until the annular chamber 66 defined by the walls of the inner tube 51 and the outer tube 54 is completely filled with the lubricant. A slight additional amount of the lubricant is thereupon introduced under pressure causing a portion of the excess lubricant to pass outwardly through the openings between the bearing members in the anti-friction bearings 56. Since there is a relatively constant although slight amount of pressure on the lubricant from the interior compartments resulting from the initial pressure application, a continuous but light flow of lubricant takes place around the ends 71 of the anti-friction bearings; and, as the rollers are rotated, centrifugal force causes a slight but continuing radially outward flow of the lubricant to occur. The characteristics of the lubricant are chosen with a view toward permitting a continuous small flow of the lubricant to take place as frictional and atmospheric warming of the member of the fairlead takes place. As the fairlead rotates and assumes various attitudes, the excess lubricant from both ends flows along the exterior surfaces of the two rollers, as appears most clearly in Figure 2, and as designated by the numeral 76. Once the lubricant reaches the outermost surfaces of the two rollers, the longitudinal back and forth whipping motion of the cable along the channel between the rollers as well as its translational movement resulting from the varying locations of the bucket, for example, causes rotation of the rollers to occur and causes the cable physically to contact and move and spread the lubricant layer from one end of the rollers to the other. In other words, the cable, in its movements sweeps across the entire surface of both rollers. It has been found in actual extensive practice that within a few moments from the original lubrication of the rollers, the entire surface of each of the rollers is uniformly coated with the lubricant. The slight but constant flow of lubricant maintains or continues this uniform dressing on the rollers. Since the cable itself is in constant contact with one or the other of the rollers at some ever shifting point along the periphery of the rollers, the cable itself is uniformly coated with the lubricant to a rather uniform depth, it being understood that the cable is continuously being paid out and reaved in across the rollers as well as moving longitudinally between the rollers and being swung laterally against one roller or the other. The strands of the cable are thus continually dressed in a uniform fashion throughout the used cable length; and, owing to the marked frictional reduction resulting from the dressing, not only the surface of the rollers but the cable itself are given a life span many-fold the longevity encountered without the use of a self-dressing feature of this nature.

It can therefore be seen that I have provided a rotating fairlead which not only directly effects economies by prolonging the life of the fairlead and the cable but which indirectly brings about a marked reduction in costs attributable to maintenance and to replacement time. It has been found, for example, that the rotatable fairlead of my invention has reduced cable wear, even under severe conditions of use, five to ten-fold or even more, as a consequence, it is believed, of the self-dressing feature which almost entirely eliminates the rapid wear of metal to metal contact found in fairlead devices of the kinds previously used.

What is claimed is:

1. A self-lubricating fairlead including an elongated housing having a pair of opposite end walls, a pair of sheaves mounted transversely in said housing in substantially co-planar spaced relation to guide a cable therebetween, a pair of right circular cylindrical rollers rotatably mounted on said housing in parallel spaced relation between said end walls to guide a cable therebetween, each of said rollers including a hollow inner tube extending between said opopsite end walls, said inner tube having an aperture extending through its wall, an outer tube mounted concentrically about said inner tube, said outer tube including a smooth uninterrupted outer surface, the ends of each of said outer tubes being closely spaced to the adjacent one of said end walls, a pair of antifriction bearings interposed between said inner and said outer tube, the inner race of each of said bearings being in abutment with the adjacent one of said end walls and the outer end of the outer race being substantially coextensive with the adjacent end of said outer tube, and a grease fitting mounted on one end of said inner tube.

2. In a fairlead rotatably mounted on the boom of an excavating apparatus, said fairlead including an elongated housing having rotatably mounted therein a pair of transversely disposed sheaves, the combination of a pair of spaced parallel longitudinally disposed rollers, said rollers being rotatably mounted in said housing at right angles to the axis of rotation of said sheaves, each of said rollers including a hollow inner tube affixed to said housing and having an outer surface interrupted by an aperture extending to the interior of said tube, a hollow outer tube concentrically disposed about and spaced from said inner tube, a pair of anti-friction bearings interposed between said inner and said outer tube, the ends of said outer tube and the ends of the outer races of said bearings forming with the adjacent surfaces of said housing a narrow annular passageway, and means for introducing a lubricant into the interior of said inner and said outer tubes under pressure whereby at least a portion of the lubricant flows longitudinally through said bearings and radially through said passageways toward the outer surfaces of said outer tubes.

References Cited in the file of this patent

UNITED STATES PATENTS

| | | |
|---|---|---|
| 887,831 | Muth | May 19, 1908 |
| 2,356,255 | Lichtenberg | Aug. 22, 1944 |
| 2,471,036 | Jenkins | May 24, 1949 |